(12) United States Patent
Omi

(10) Patent No.: US 8,922,846 B2
(45) Date of Patent: Dec. 30, 2014

(54) READING APPARATUS, METHOD OF CONTROLLING THE SAME AND STORAGE MEDIUM

(71) Applicant: Canon Kabushiki Kaisha, Tokyo (JP)

(72) Inventor: Hiromi Omi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/850,963

(22) Filed: Mar. 26, 2013

(65) Prior Publication Data

US 2013/0258423 A1    Oct. 3, 2013

(30) Foreign Application Priority Data

Mar. 29, 2012 (JP) ................. 2012-076773

(51) Int. Cl.

| H04N 1/04 | (2006.01) |
|---|---|
| H04N 1/00 | (2006.01) |
| G06K 9/32 | (2006.01) |
| H04N 1/32 | (2006.01) |
| H04N 1/195 | (2006.01) |

(52) U.S. Cl.
CPC .... *H04N 1/00782* (2013.01); *H04N 2201/0436* (2013.01); *G06K 9/32* (2013.01); *H04N 2201/3247* (2013.01); *H04N 1/3248* (2013.01); *H04N 1/19594* (2013.01)
USPC ........................... 358/474; 358/513; 358/514

(58) Field of Classification Search
CPC ... H04N 5/225; H04N 5/2628; H04N 1/0044; H04N 1/2112; H04N 1/2154; H04N 1/32133; H04N 2101/00; H04N 2201/0008; H04N 2201/3222; H04N 2201/3269; H04N 2201/3276; H04N 2201/328; H04N 1/00127
USPC ............... 358/474, 1.13, 1.14, 1.15, 1.9, 475, 358/488, 497, 518, 513, 514
See application file for complete search history.

(56) References Cited

U.S. PATENT DOCUMENTS

| 7,420,718 | B2 * | 9/2008 | Shimizu ....................... 358/498 |
|---|---|---|---|
| 7,605,940 | B2 * | 10/2009 | Silverbrook et al. ........ 358/1.17 |
| 7,694,963 | B2 * | 4/2010 | Iwago et al. ............. 271/258.01 |
| 8,089,663 | B2 * | 1/2012 | Cui et al. ...................... 358/474 |
| 8,274,665 | B2 * | 9/2012 | Silverbrook ................... 358/1.1 |
| 8,284,461 | B2 * | 10/2012 | Rusman et al. ............... 358/475 |
| 8,395,821 | B2 * | 3/2013 | Tsukahara et al. .......... 358/3.26 |
| 8,559,071 | B2 * | 10/2013 | Kawata ......................... 358/474 |
| 8,619,328 | B2 * | 12/2013 | Kashibuchi et al. ........ 358/3.06 |
| 8,665,502 | B2 * | 3/2014 | Masaki et al. ............... 358/488 |
| 8,780,417 | B2 * | 7/2014 | Yamamura ................... 358/474 |
| 8,780,419 | B2 * | 7/2014 | Higashitani .................. 358/484 |
| 2011/0299136 | A1 * | 12/2011 | Kubo et al. ................... 358/474 |
| 2012/0320434 | A1 * | 12/2012 | Takeda ......................... 358/475 |
| 2013/0314730 | A1 * | 11/2013 | Takahashi .................... 358/1.13 |
| 2013/0321858 | A1 * | 12/2013 | Takabatake ................. 358/1.15 |

FOREIGN PATENT DOCUMENTS

JP           9-307712 A        11/1997

\* cited by examiner

*Primary Examiner* — Negussie Worku
(74) *Attorney, Agent, or Firm* — Canon U.S.A., Inc. IP Division

(57) ABSTRACT

A reading apparatus reads an object placed faceup on a reading plate by using an imaging unit attached above the reading plate, and determines whether a user has reversed the read object by using information about the read object. If the read object is determined to have been reversed, the reading apparatus reads the reversed object by using the imaging unit and associates respective pieces of data of the two read objects with each other.

20 Claims, 17 Drawing Sheets

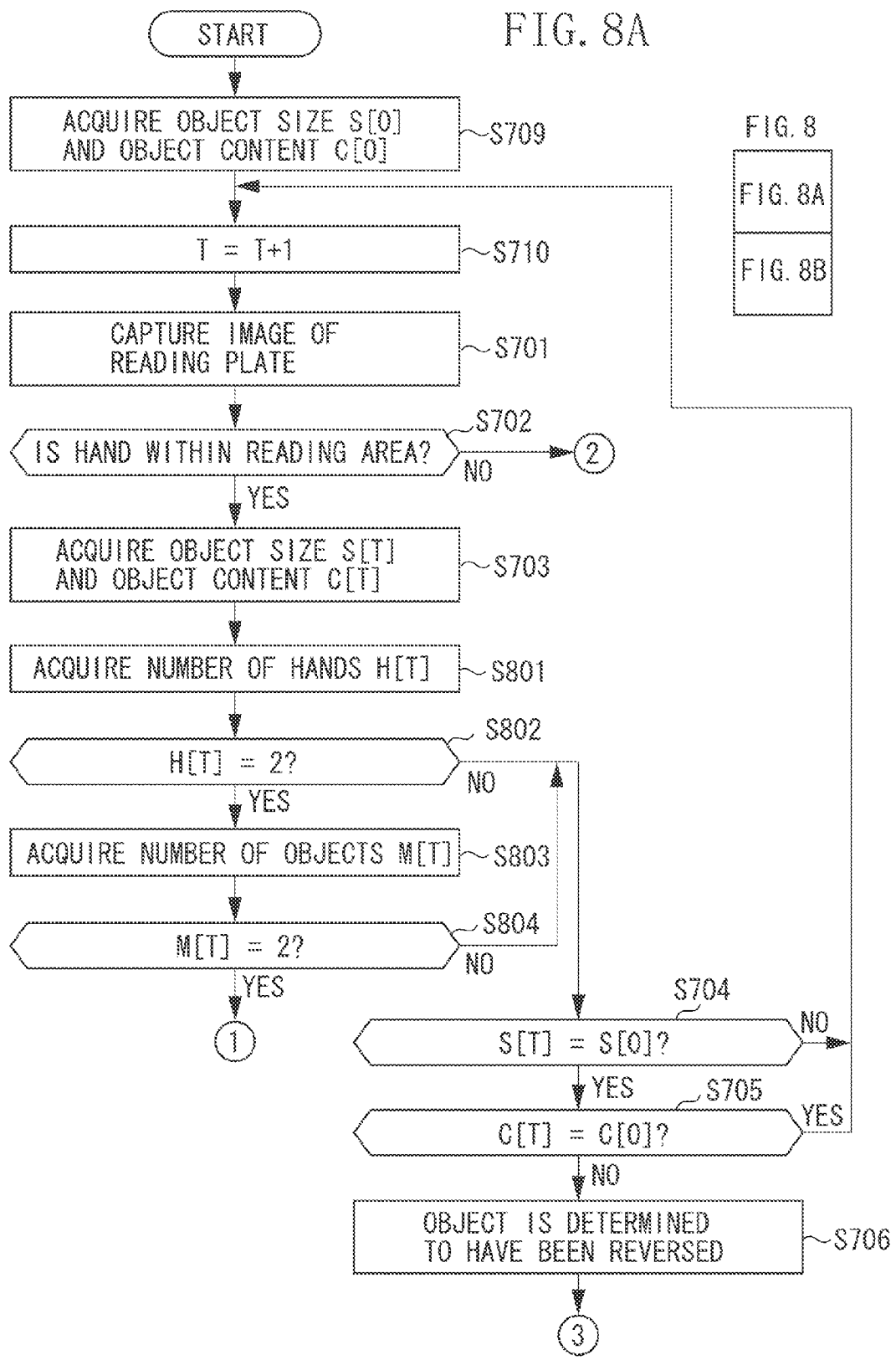

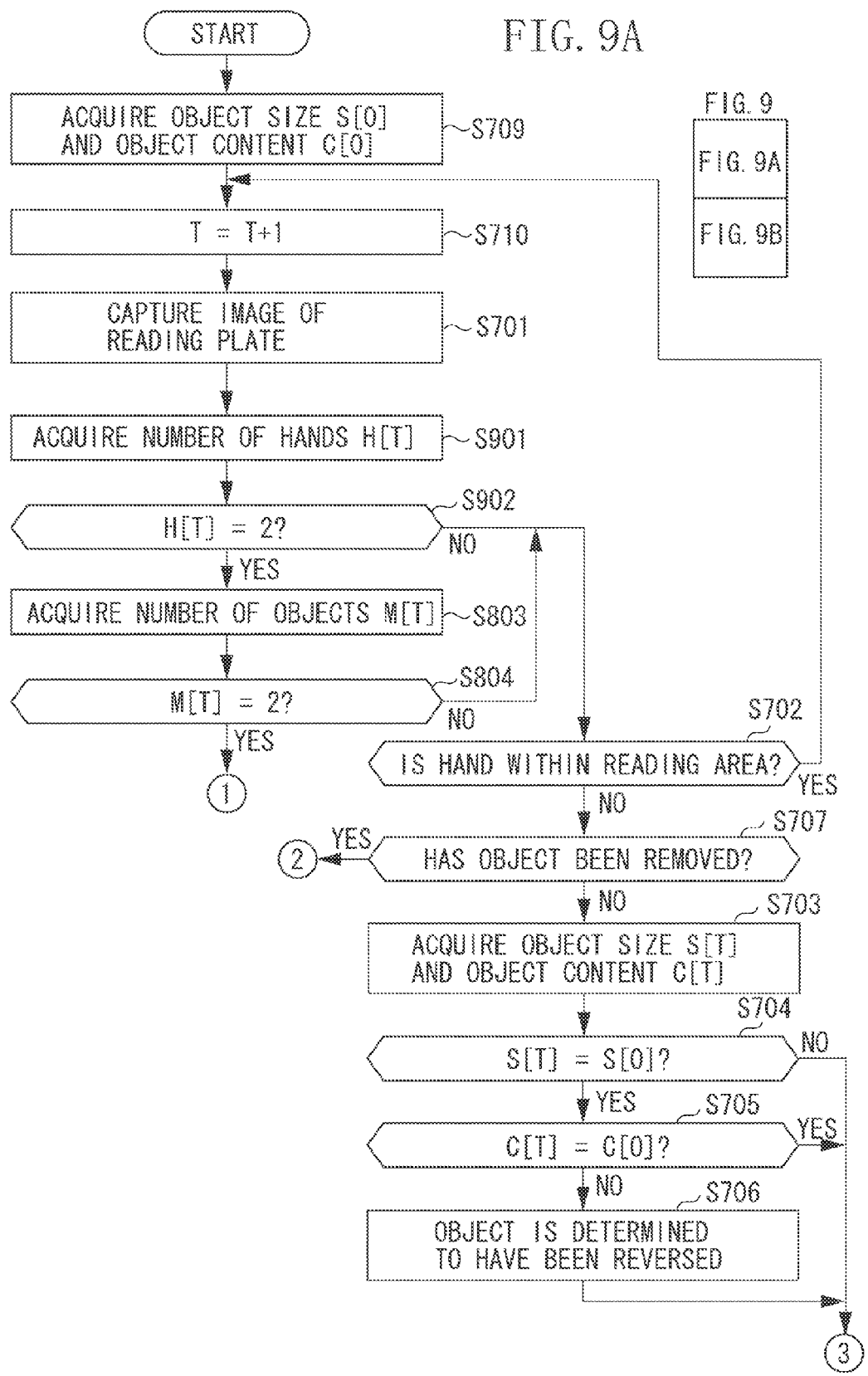

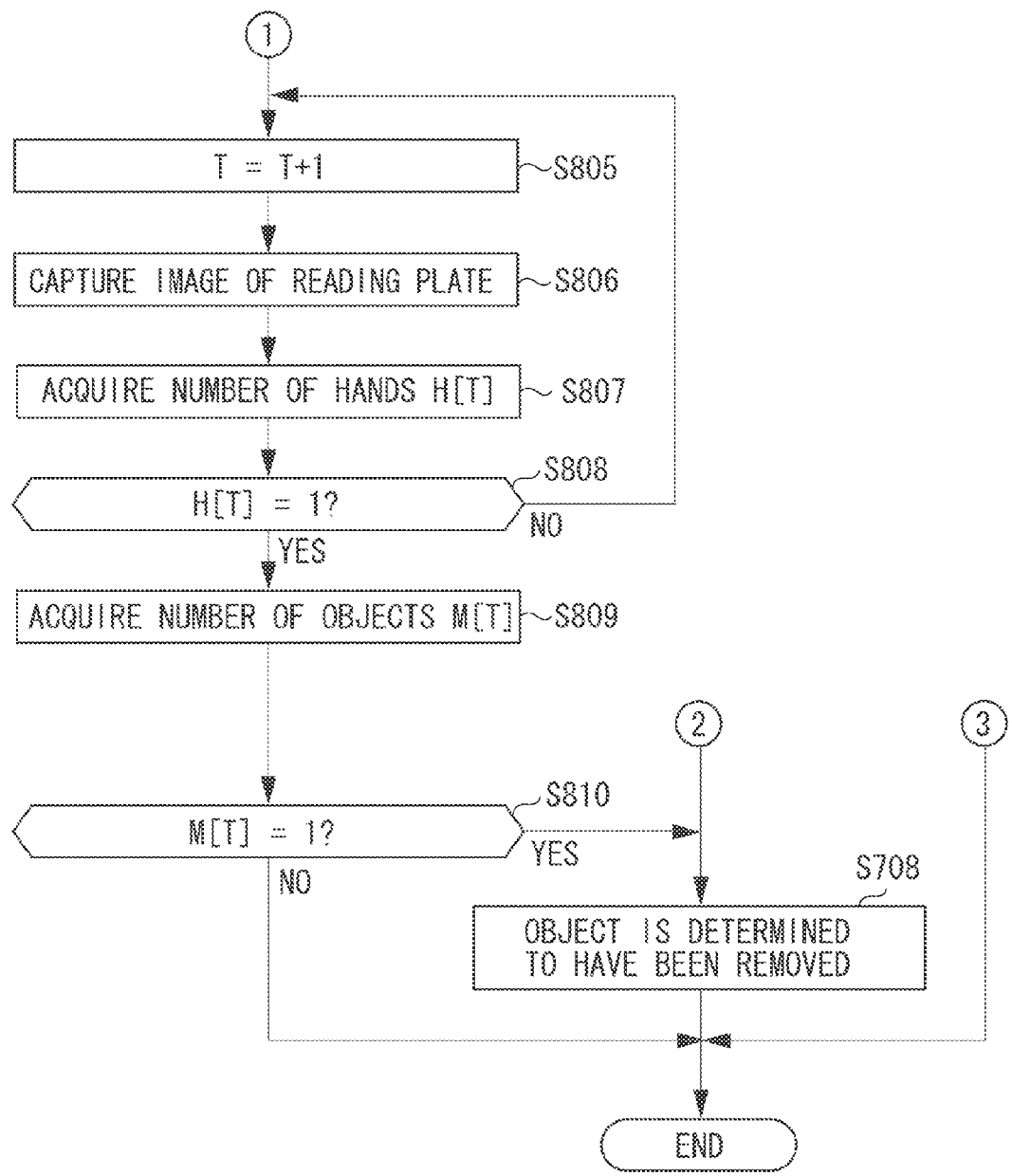

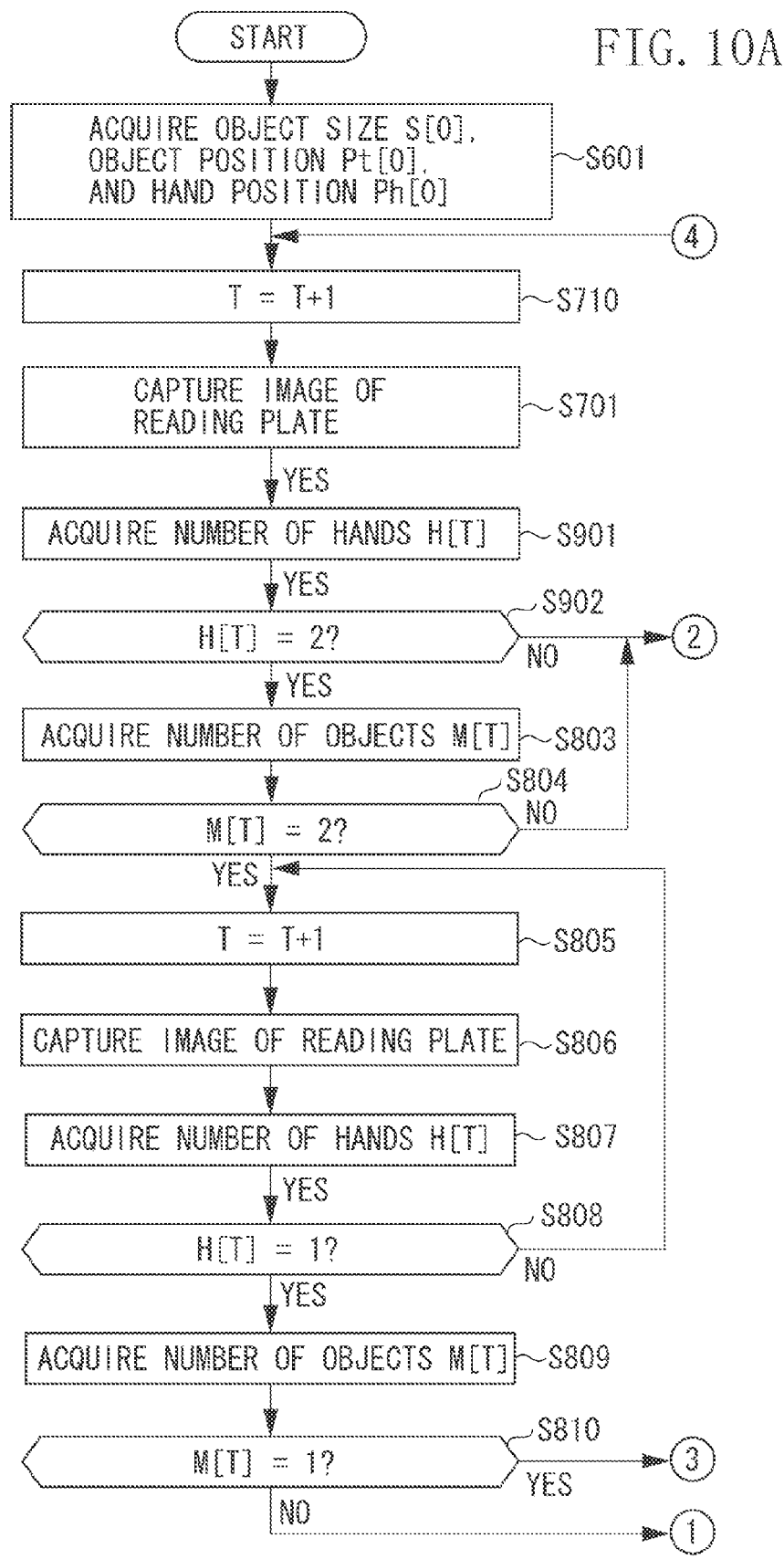
FIG. 10A

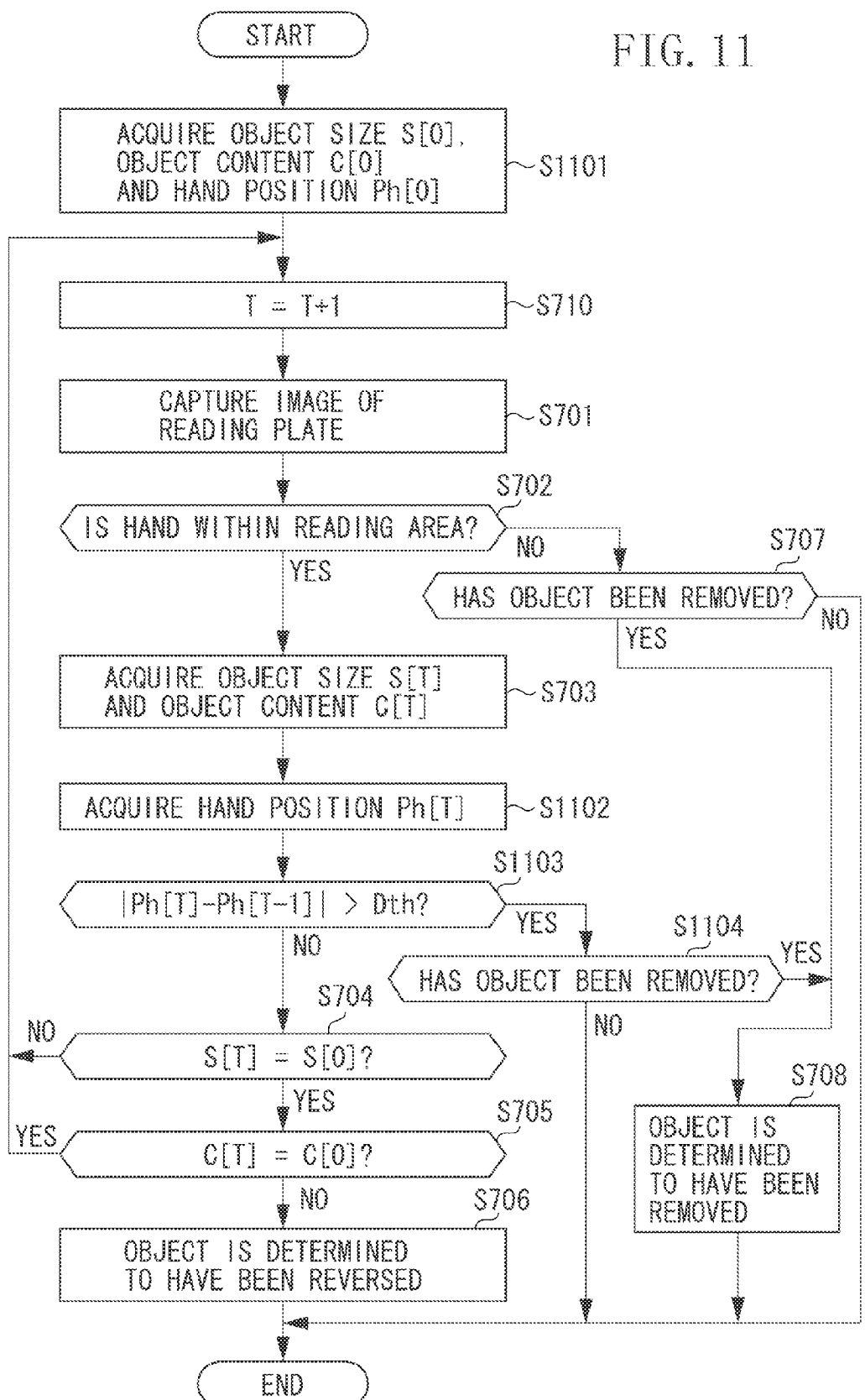

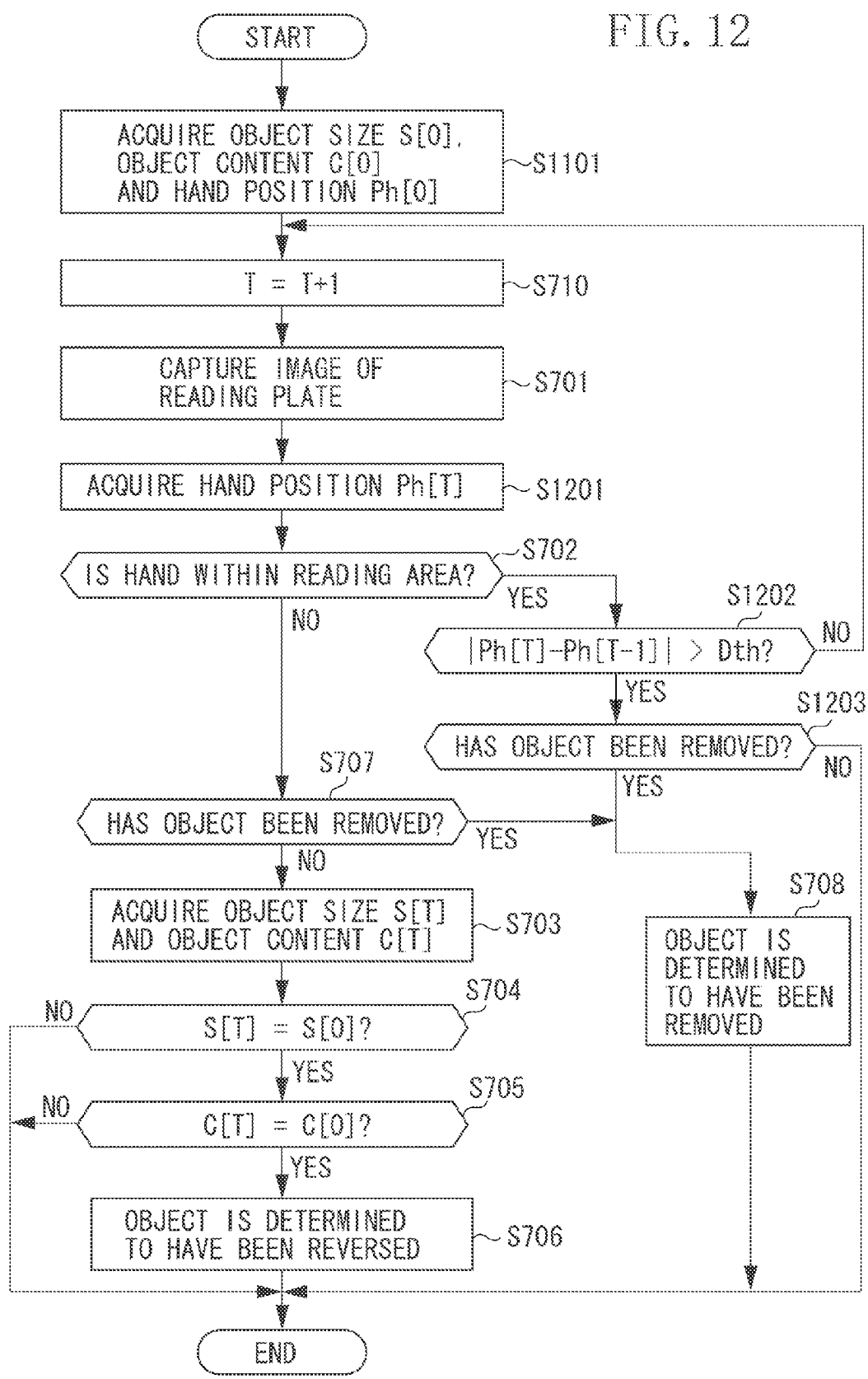

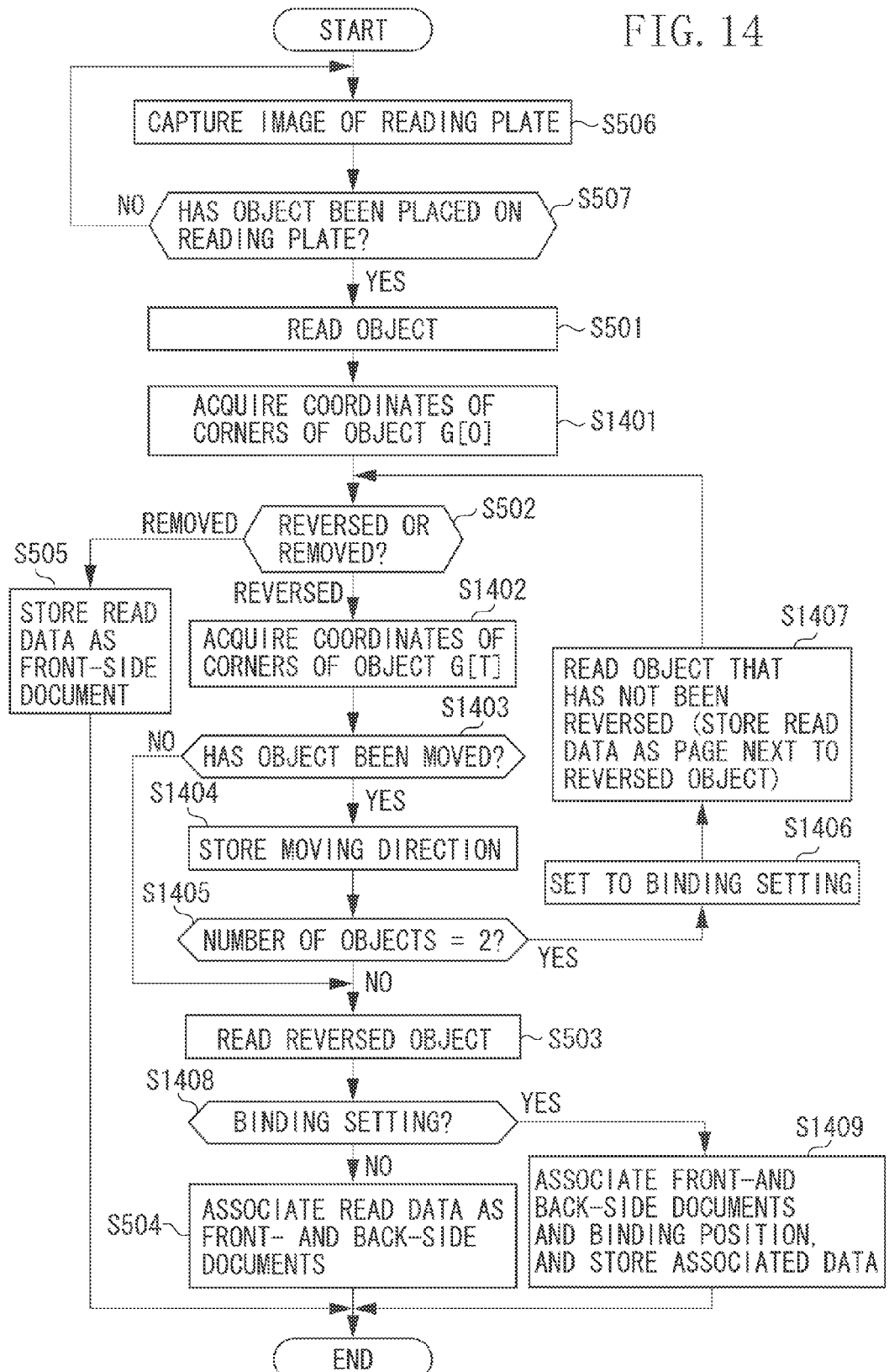

READING APPARATUS, METHOD OF CONTROLLING THE SAME AND STORAGE MEDIUM

BACKGROUND OF THE INVENTION

1. Field of the Invention

The present invention relates to a reading apparatus that reads an object placed faceup on a reading plate.

2. Description of the Related Art

Many of the currently-available reading apparatuses use a scanner to read a document placed facedown on a document positioning plate. However, in recent years, a reading apparatus that reads a document placed faceup on the document positioning plate has been proposed. Such reading apparatus uses an imaging unit attached above the document positioning plate to read the document.

Japanese Patent Application Laid-Open No. 9-307712 discusses using a range-finding unit such as a range-finding sensor and determining, based on change of the distance from the document, the direction in which a user reverses a page of a book document.

The method discussed in Japanese Patent Application Laid-Open No. 9-307712 can detect when the user reverses the page of the book document and a reading sequence based on the direction in which the user reverses the page. However, Japanese Patent Application Laid-Open No. 9-307712 does not discuss a process relating to a two-sided document, for example, a sheet-type two-sided document, which is not a book document. Namely, read images on the two sides cannot be associated with each other. Thus, if a user wishes to associate the two sides with each other, the user needs to give an instruction for this association after the two sides are read.

SUMMARY OF THE INVENTION

The present invention is directed to a reading apparatus capable of associating read images on two sides based on a user operation executed on an object.

According to an aspect of the present invention, a reading apparatus includes a first reading unit configured to read an object placed faceup on a reading plate by using an imaging unit attached above the reading plate, a determination unit configured to determine whether a user has reversed the read object by using information about the read object, a second reading unit configured to read, if the determination unit determines that the read object has been reversed, the reversed object by using the imaging unit, and an association unit configured to associate data of the object read by the first reading unit with data of the object read by the second reading unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9, composed of FIGS. 9A and 9B, is another detailed flowchart (method 2) of step S502 in FIG. 3 according to the first variation.

FIG. 11 is a detailed flowchart (method 1) of step S502 in FIG. 3 according to a second variation.

FIG. 12 is another detailed flowchart (method 2) of step S502 in FIG. 3 according to the second variation.

FIG. 14 is a flowchart of an operation of a reading apparatus according to a second exemplary embodiment.

DESCRIPTION OF THE EMBODIMENTS

Various exemplary embodiments, features, and aspects of the invention will be described in detail below with reference to the drawings.

Figure 2:
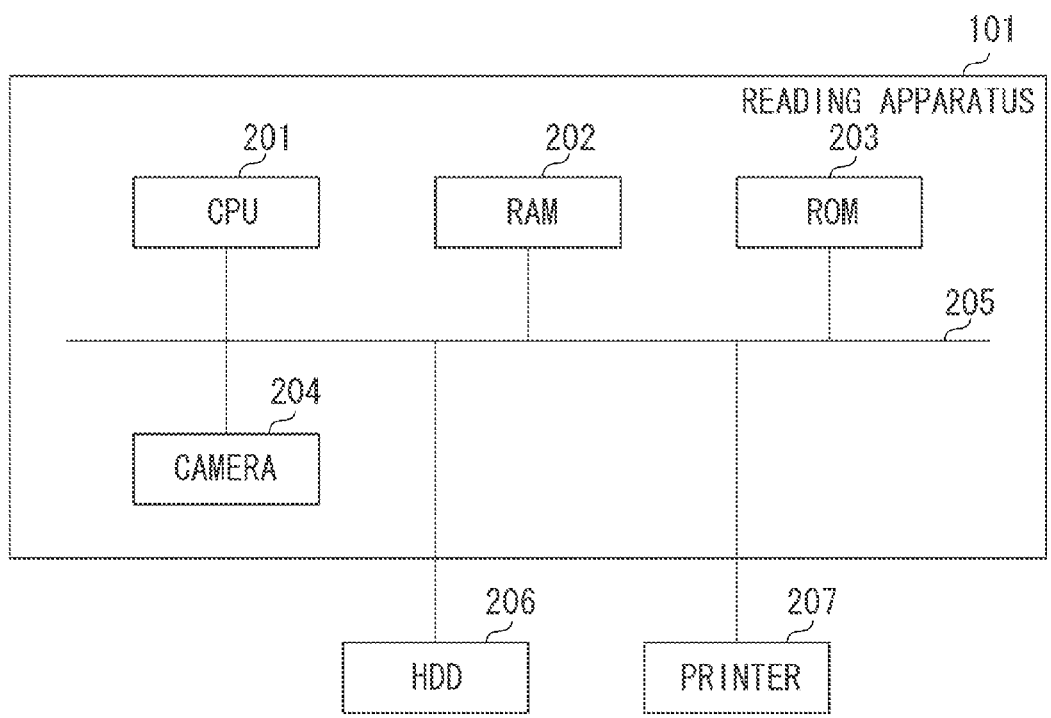
FIG. 2 illustrates a hardware configuration of the reading apparatus according to the first exemplary embodiment of the present invention.

FIG. 2 illustrates a hardware configuration of a reading apparatus 101.

In FIG. 2, the reading apparatus 101 includes a central processing unit (CPU) 201, a random access memory (RAM) 202, a read-only memory (ROM) 203, a camera 204, a system bus 205, a hard disk drive (HDD) 206, and a printer 207. Various elements in the reading apparatus 101 are connected to one another via the system bus 205 and these elements transmit/receive signals to/from one another via the system bus 205. The HDD 206 is an external storage device.

Figure 1A:
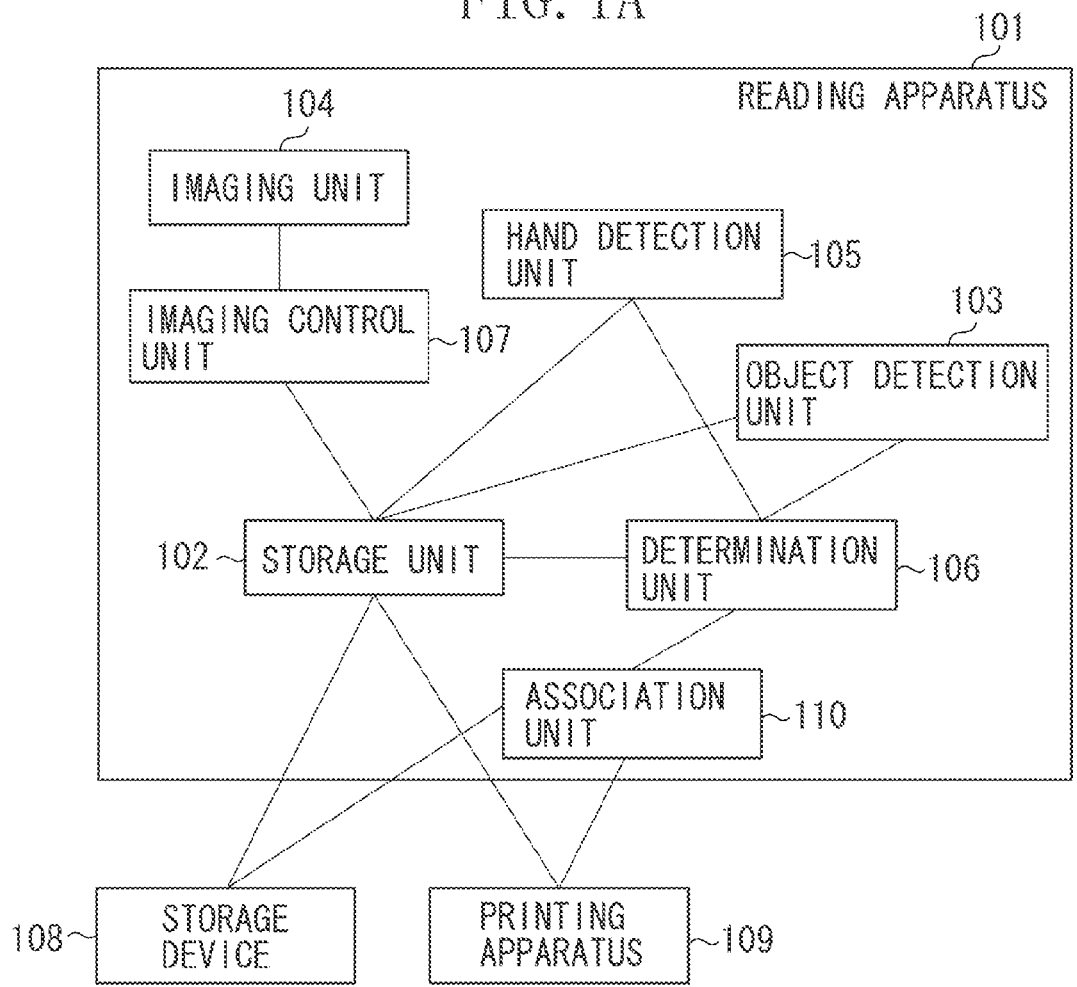
FIGS. 1A and 1B are a block diagram and an external view of a reading apparatus according to a first exemplary embodiment of the present invention.

FIG. 1A is a functional block diagram of the reading apparatus 101.

An imaging unit 104 is a camera or a video camera, for example.

Figure 1B:
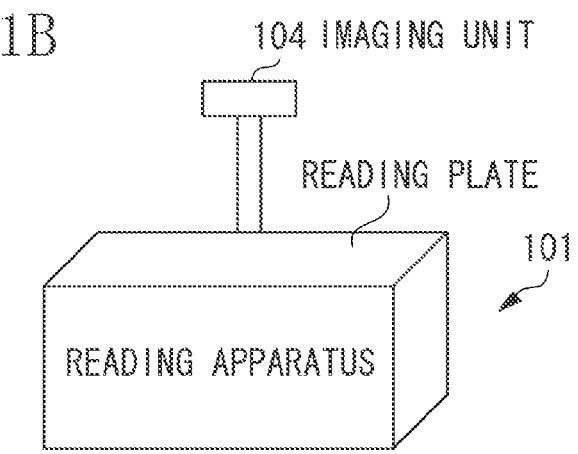

FIG. 1B is an external view of the reading apparatus 101.

The imaging unit 104 is attached above a reading plate and captures an object placed faceup on the reading plate and a user's hand above the reading plate. The following description will be made, assuming that a reading area corresponds to the area where the imaging unit 104 can execute imaging, and that the size of the reading plate is the same as that of the reading area.

An imaging control unit 107 controls the imaging unit 104 and includes the CPU 201. The imaging control unit 107 reads a program or data from the ROM 203 to the RAM 202 and executes the program or data. The imaging control unit 107 controls object reading timing and the detection area, for example.

A storage unit 102 corresponds to the RAM 202 and stores read data. The read data is obtained by causing the imaging unit 104 to read the object. In addition, the storage unit 102 stores information about the object and information about a detected hand.

An object detection unit 103 includes the CPU 201 and reads a program or data from the ROM 203 to the RAM 202 to detect an object, automatically clip a plurality of objects, or acquire coordinates of the object on the reading plate.

A hand detection unit 105 includes the CPU 201 and reads a program or data from the ROM 203 to the RAM 202 to detect the presence, the movement, or the position of the user's hand, for example.

A determination unit 106 includes the CPU 201 and reads a program or data from the ROM 203 to the RAM 202. The determination unit 106 determines whether the user has reversed or removed the object, based on the information about the user's hand detected by the hand detection unit 105. In addition, the determination unit 106 compares the sizes or the contents of a plurality of objects. Furthermore, the determination unit 106 compares the moving directions of the user's hand and the object.

An association unit 110 includes the CPU 201, reads a program or data from the ROM 203 to the RAM 202, and associates read data stored in the storage unit 102 with each other as front- and back-side documents.

A storage device 108 corresponds to the HDD 206 and stores data stored in the storage unit 102 as stored data. The stored data is read data and various types of setting information (two-sided images, binding positions, etc.).

A printing apparatus 109 corresponds to the printer 207 and prints data stored in the storage unit 102.

While the imaging unit 104 is included in the reading apparatus 101 in FIG. 1A, the imaging unit 104 may be provided as an external apparatus. Likewise, while the storage device 108 and the printing apparatus 109 are externally provided in FIG. 1A, the storage device 108 and the printing apparatus 109 may be included in the reading apparatus 101. In addition, while the object detection unit 103 and the hand detection unit 105 have been described as separate units, these units 103 and 105 may be provided as a single detection unit.

Figure 3:
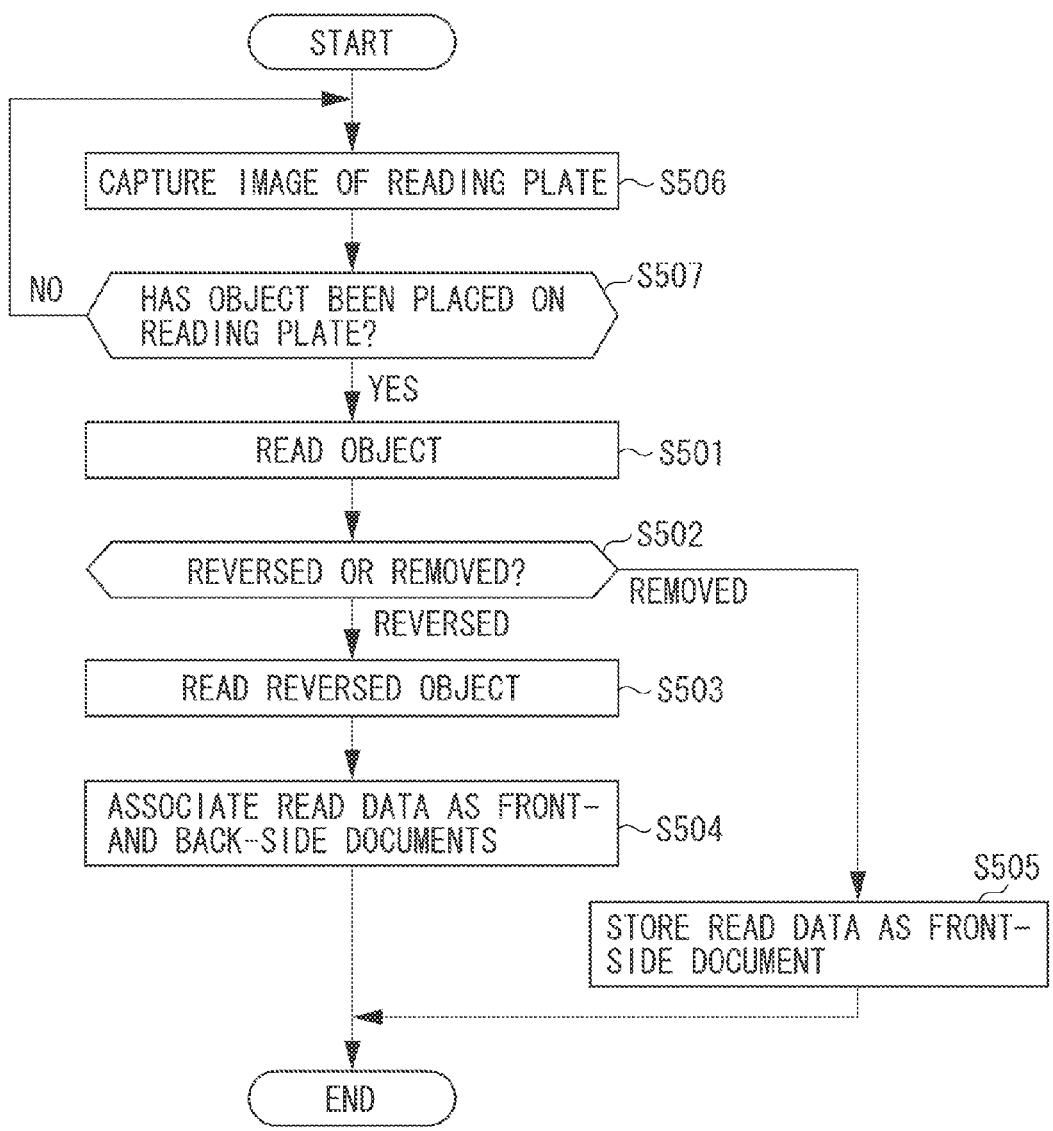
FIG. 3 is a flowchart of an operation of the reading apparatus according to the first exemplary embodiment.

FIG. 3 is a flowchart of an operation of the reading apparatus 101 according to the first exemplary embodiment.

In step S506, the imaging unit 104 captures an image of the reading plate. The storage unit 102 temporarily stores the captured data.

In step S507, the determination unit 106 determines whether an object has been placed on the reading plate. The determination unit 106 uses the data captured in step S506 to determine whether an object has come to rest on the reading plate.

If the determination unit 106 determines that no object has been placed on the reading plate (NO in step S507), the operation returns to step S506. If the determination unit 106 determines that an object has been placed on the reading plate (YES in step S507), the operation proceeds to step S501.

In step S501, the imaging unit 104 reads the object and stores the read data in the storage unit 102 (a first reading process). In this step, object data may be clipped from the data captured in step S506. Alternatively, the imaging unit 104 may capture an image of the reading plate again and acquire object data.

In step S502, the determination unit 106 determines whether the object read in step S501 has been reversed or removed. If the determination unit 106 determines that the object has been reversed, (REVERSED in S502), the operation proceeds to step S503. If the determination unit 106 determines that the object has been removed (REMOVED in S502), the operation proceeds to step S505.

In step S503, the imaging unit 104 reads the reversed object and stores the read data in the storage unit 102 (a second reading process).

In step S504, the association unit 110 associates the read data with each other as the front-side document (read data read in step S501) and the back-side document (read data read in step S503). In this step, the association unit 110 stores the associated read data in the storage device 108 as stored data.

In step S505, the association unit 110 recognizes the read data (read data read in step S501) as the front-side document and stores the read data in the storage device 108 as the stored data.

Figure 4:
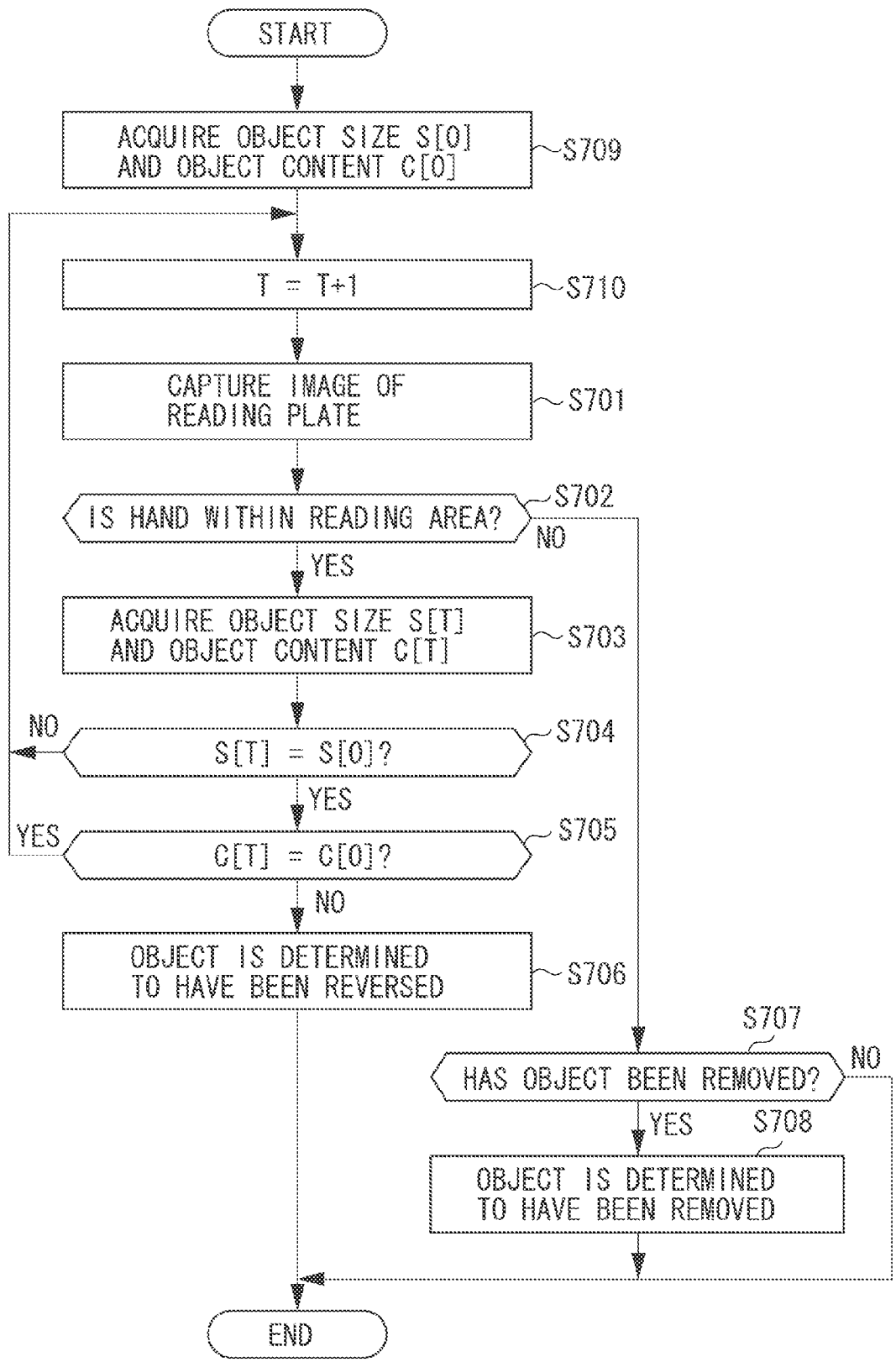
FIG. 4 is a detailed flowchart (method 1) of step S502 in FIG. 3.

FIG. 4 is a detailed flowchart (method 1) of step S502 in FIG. 3.

In step S709, the object detection unit 103 stores the size and the content of the object read in step S501 in the storage unit 102.

The object detection unit 103 defines the time when the object is read in step S501 to be 0, the size of the object to be S[0], and the content of the object to be C[0]. If the object is rectangular, the object detection unit 103 uses the read data to acquire the vertical and the horizontal lengths of the object and determines the size S[0]. If the object is not rectangular, the object detection unit 103 uses the read data to acquire the vertical and the horizontal lengths of the minimum circumscribed rectangle of the object, and determines the size S[0]. The object content C[0] is the read data, namely, an image.

In step S710, after a predetermined period of time, the determination unit 106 determines time T=T+1.

In step S701, the imaging unit 104 captures an image of the reading plate.

In step S702, the hand detection unit 105 uses the data captured in step S701 to determine whether a user's hand is present within the reading area.

An existing technique is used for detecting a hand. For example, a hand can be detected by detecting a skin color or a shape. If the hand detection unit 105 determines that a hand is present within the reading area (YES in step S702), the operation proceeds to step S703. If not (NO in step S702), the operation proceeds to step S707.

In step S703, the imaging unit 104 reads the object on the reading plate.

The size and the content of the object read in this step will be represented by S[T] and C[T], respectively. If the object is rectangular, the object detection unit 103 uses the read data to acquire the vertical and the horizontal lengths of the object, and determines the size S[T]. If the object is not rectangular, the object detection unit 103 uses the read data to acquire the vertical and the horizontal lengths of the minimum circumscribed rectangle of the object, and determines the size S[T]. The object content C[T] is the read data, namely, an image.

In step S704, the determination unit 106 determines whether the size S[T] of the object read in step S703 is the same as the size S[0] of the object read in step S501. More specifically, the determination unit 106 compares the vertical and the horizontal lengths of the object read in step S703 with those of the object read in step S501.

If the vertical and the horizontal lengths are the same (YES in step S704), the operation proceeds to step S705. If not (NO in step S704), the operation returns to step S710.

In step S705, the determination unit 106 determines whether the content C[T] of the object read in step S703 is the same as the content C[0] of the object read in step S501. The determination unit 106 uses an existing technique to determine whether the contents C[T] and C[0] are the same. For example, whether the contents C[T] and C[0] are the same can be determined by comparing characters through image comparison or optical character recognition (OCR) processing.

If the determination unit 106 determines that the content C[T] is the same as the content C[0] (YES in step S705), the operation returns to step S710. If not (NO in step S705), the operation proceeds to step S706.

In step S706, the determination unit 106 determines that the object has been reversed, and the operation proceeds to END.

In step S707, the object detection unit 103 determines whether the object has been removed from the reading plate. More specifically, if the object has been removed within a predetermined period of time, the object detection unit 103 determines that the object has been removed.

If the object detection unit 103 determines that the object has been removed (YES in step S707), the operation proceeds to step S708. Otherwise (NO in step S707), the operation proceeds to END.

In step S708, the determination unit 106 determines that the object has been removed, and the operation proceeds to END.

The method illustrated in FIG. 4 for determining whether the object has been reversed or removed will be referred to as method 1. Even when a hand is present within the reading area, whether the object has been reversed can be determined by the method 1.

Figure 5:
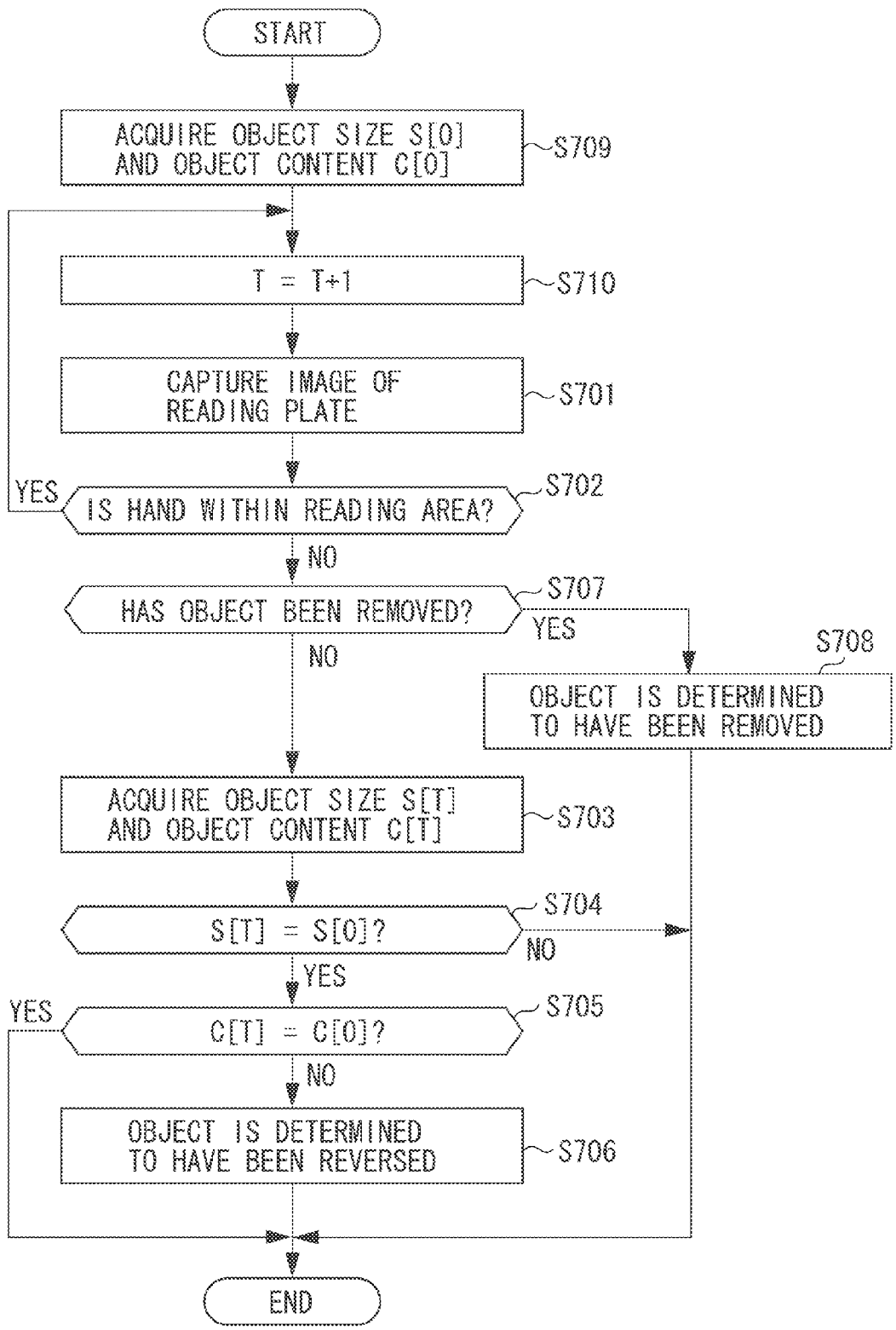
FIG. 5 is another detailed flowchart (method 2) of step S502 in FIG. 3.

FIG. 5 is another detailed flowchart (method 2) of step S502 in FIG. 3. The steps in FIG. 5 that are the same as those in FIG. 4 are denoted by the same reference numerals, and redundant description thereof will be avoided.

In FIG. 4, even when a hand is present within the reading area, whether the object has been reversed is determined. However, in FIG. 5, after the hand detection unit 105 determines that a hand is not present within the reading area, the determination unit 106 determines whether the object has been reversed.

The method in FIG. 5 for determining whether the object has been reversed or removed will be referred to as method 2. With the method 2, only when the hand detection unit 105 determines that a hand is not present within the reading area, the determination unit 106 compares the sizes or the contents of the objects. Thus, processing load for comparing the sizes and the contents of the objects can be reduced.

Figure 6:
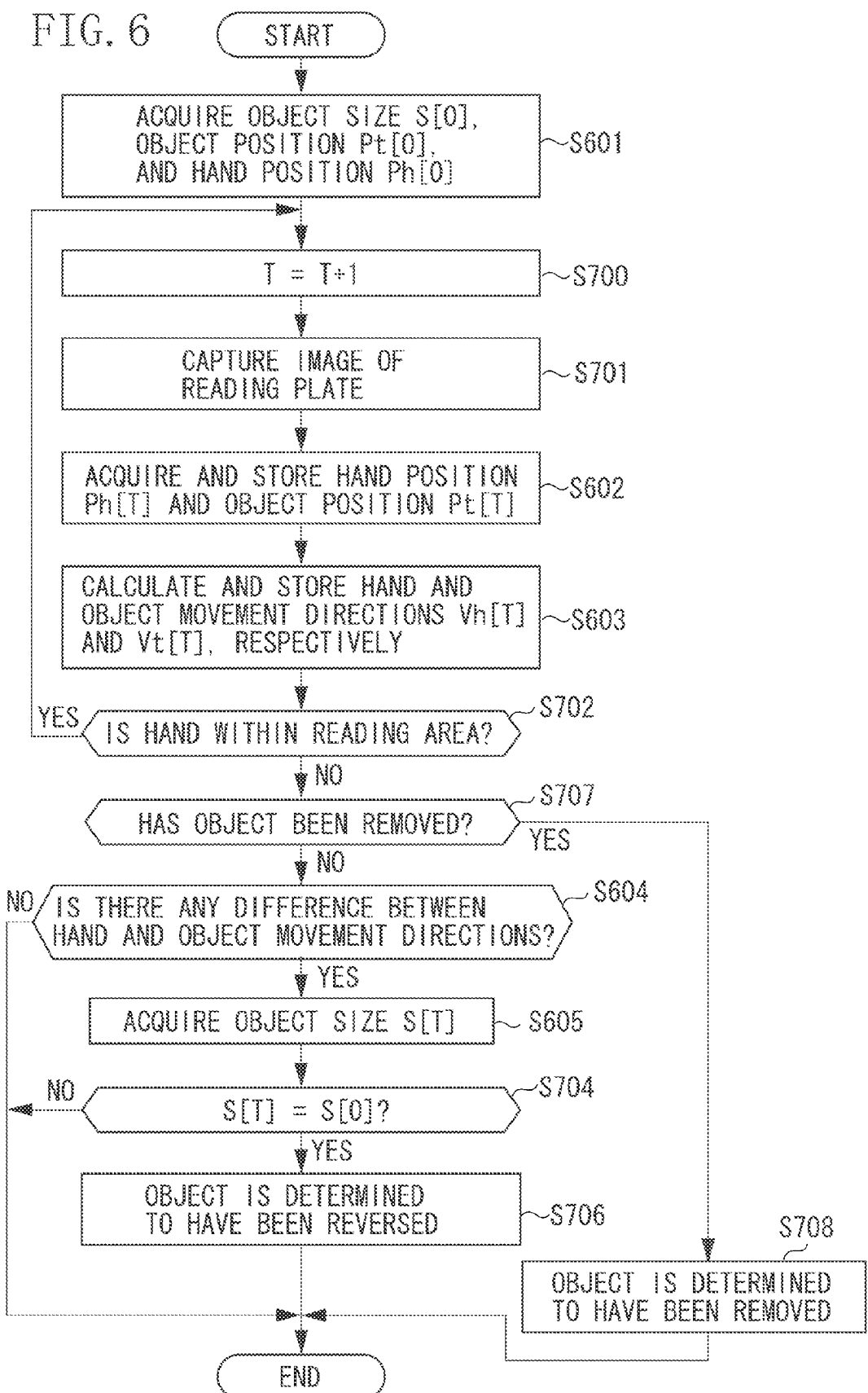
FIG. 6 is another detailed flowchart (method 3) of step S502 in FIG. 3.

FIG. 6 is another detailed flowchart (method 3) of step S502 in FIG. 3. The steps in FIG. 6 that are the same as those in FIG. 4 are denoted by the same reference numerals, and redundant description thereof will be avoided.

In step S601, the object detection unit 103 acquires the size S[0] of the object read in step S501 and position Pt[0] of the object, and the hand detection unit 105 acquires position Ph[0] of a user's hand of when the object is read in step S501.

In step S602, the hand detection unit 105 acquires a hand position Ph[T] detected within the reading area. In addition, the object detection unit 103 determines the position of the object detected within the reading area to be Pt[T]. If the object is rectangular, the object position Pt[T] is represented by coordinates at the top-left corner, for example. If the coordinates at the top-left corner cannot be read, coordinates at another corner may be used.

In step S603, the hand detection unit 105 calculates a direction Vh[T] in which the hand moves, and stores the direction Vh[T] in the storage unit 102. The hand moving direction Vh[T] can be obtained by using positions Ph[T−1] and Ph[T]. In addition, the object detection unit 103 calculates a direction Vt[T] in which the object is moved, and stores the direction Vt[T] in the storage unit 102. The document moving direction Vt[T] can be obtained by using positions Pt[T−1] and Pt[T]. In this example, Ph[0]=0 and Pt[0]=0.

In step S604, the determination unit 106 compares the hand and the object moving directions stored in the storage unit 102 in step S603 at each time period T, to determine whether there is a significant difference between the hand moving direction and the object moving direction. This is because, when the user reverses the object, the hand moving direction and the object moving direction can be significantly different.

If the determination unit 106 determines that there is a significant difference between the hand moving direction and the object moving direction (YES in step S604), the operation proceeds to step S605. If not (NO in step S604), the operation proceeds to END.

In this way, by using the hand and the object moving directions, whether the object has been reversed or removed can be determined. The method in FIG. 6 for determining whether the object has been reversed or removed will be referred to as method 3. With the method 3, whether the object has been reversed can be determined, without determining the content of the object.

Thus, as described above, by determining whether the object has been reversed or removed by the user, data of the read object can be associated to be stored.

Figure 7A:
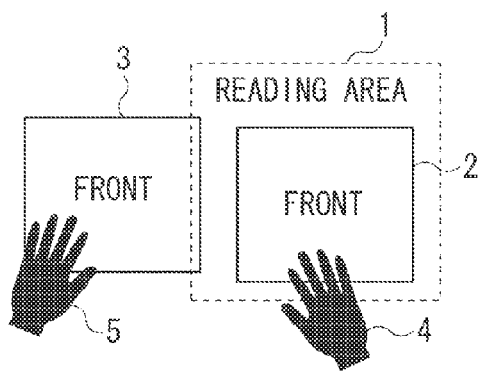
FIGS. 7A, 7B, 7C, 7D, 7E and 7F illustrate objects being switched by both hands.
Figure 7D:
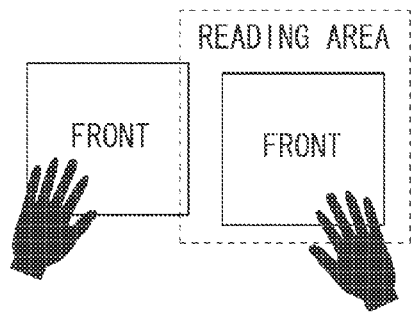
Figure 7B:
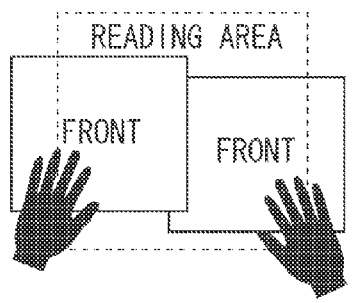
Figure 7E:
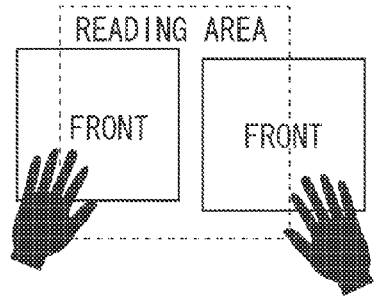
Figure 7C:
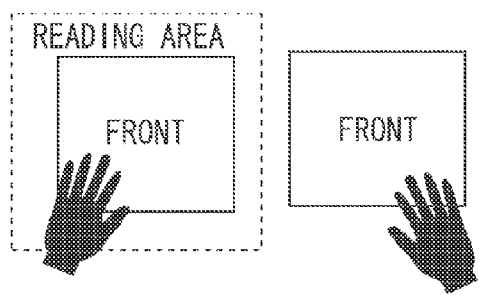

FIGS. 7A to 7C illustrate objects being switched by both hands.

FIG. 7A illustrates a right hand 4 that is about to remove a front-side document 2 from the reading plate after the front-side document 2 is read. A document reading area 1 is the area in which the imaging unit 104 can execute imaging and reading.

FIG. 7B illustrates a left hand 5 placing the front-side document 3 on the reading plate, while the right hand 4 is removing the front-side document 2 from the reading plate.

FIG. 7C illustrates the right hand 4 having removed the front-side document 2 from the reading plate and the left hand 5 placing the front-side document 3 on the reading plate. In this way, when two documents are being switched by both hands, both of the hands could be recognized in the reading area, as illustrated in FIG. 7B. Accordingly, a first variation will be described, assuming that two documents are switched by both hands and both of the hands are recognized in the reading area.

Figure 8B:
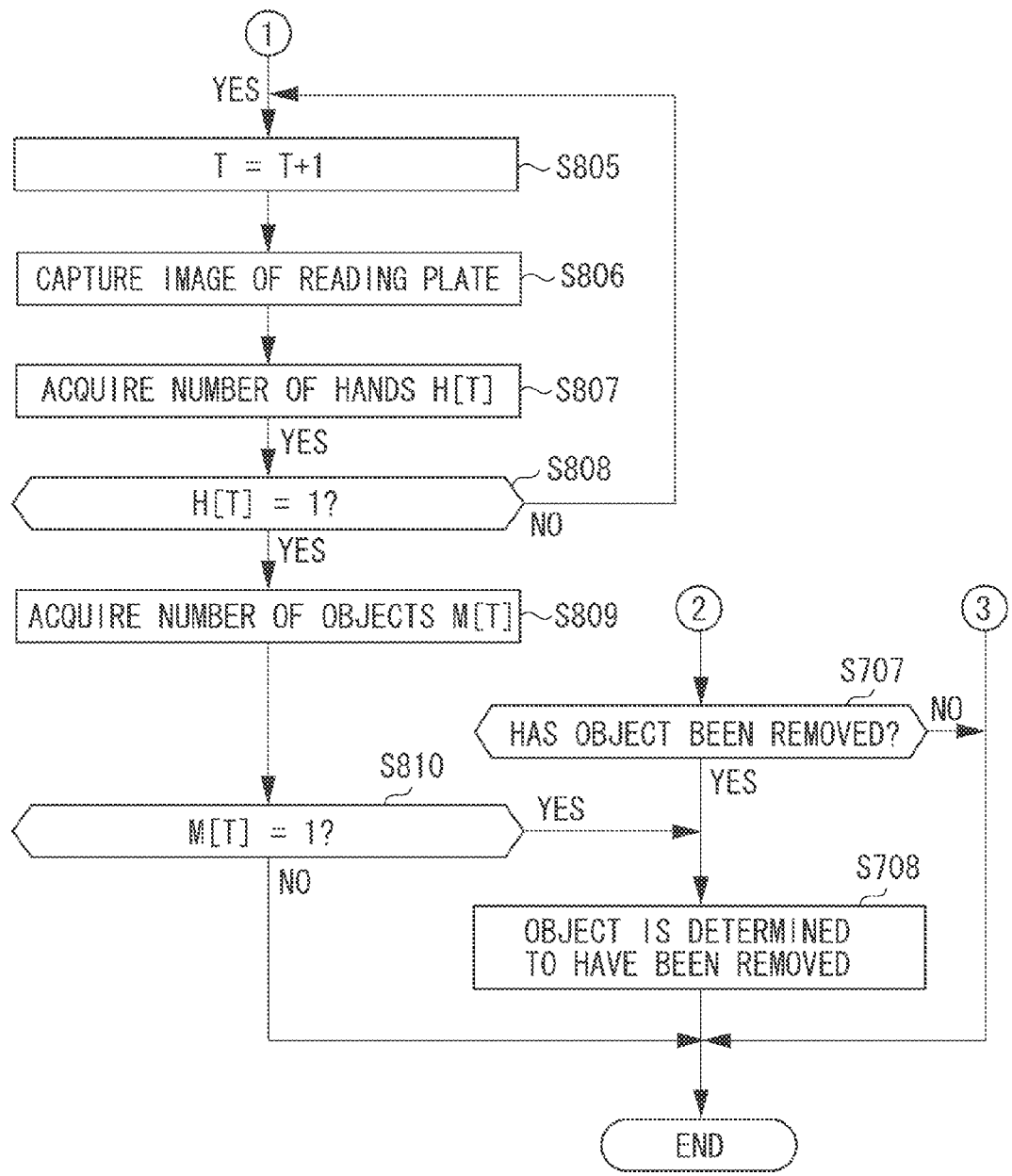
FIG. 8, composed of FIGS. 8A and 8B, is a detailed flowchart (method 1) of step S502 in FIG. 3 according to a first variation.

FIG. 8 is a detailed flowchart (method 1) of step S502 in FIG. 3 according to the first variation. The steps in FIG. 8 that are the same as those in FIG. 4 are denoted by the same reference numerals, and redundant description thereof will be avoided.

In step S801, the hand detection unit 105 detects the number of hands in the reading area and determines the detected number of hands to be H[T]. An existing technique is used for the hand detection. For example, the hand detection can be executed by detecting a skin color or a shape. In this step, the number of hands detected by the above technique is used.

In step S802, the determination unit 106 determines whether the number H[T] is 2. Namely, in this step, the determination unit 106 determines whether both hands have been detected. If the determination unit 106 determines that the number H[T] is not 2 (NO in step S802), the operation proceeds to step S704. If the number H[T] is 2 (YES in step S802), the operation proceeds to step S803.

In step S803, the object detection unit 103 detects the number of objects on the reading plate and determines the detected number of objects to be M[T]. The number of objects is obtained by clipping object data from the data captured by the imaging unit 104.

In step S804, the determination unit 106 determines whether the number M[T] is 2. Namely, in this step, the determination unit 106 determines whether the number of objects has been increased to 2. If the determination unit 106 determines that the number M[T] is not 2 (NO in step S804), the operation proceeds to step S704. If the number M[T] is 2 (YES in step S804), the operation proceeds to step S805.

In step S805, after a predetermined period of time, the determination unit 106 determines time T=T+1.

In step S806, the imaging unit 104 captures an image of the reading plate.

In step S807, the hand detection unit 105 detects the number of hands within the reading area and determines the detected number of hands to be H[T].

In step S808, the determination unit 106 determines whether the number H[T] is 1. Namely, in this step, the determination unit 106 determines whether a single hand has been detected.

If the determination unit 106 determines that the number H[T] is not 1 (NO in step S808), the operation returns to step S805. If the number H[T] is 1 (YES in step S808), the operation proceeds to step S809.

In step S809, the object detection unit 103 detects the number of objects on the reading plate and determines the detected number of objects to be M[T].

In step S810, the determination unit 106 determines whether the number M[T] is 1. Namely, in this step, the determination unit 106 determines whether the number of objects has been decreased to 1.

If the determination unit 106 determines that the number M[T] is not 1 (NO in step S810), the operation proceeds to END. If the number M[T] is 1 (YES in step S808), the operation proceeds to step S708.

FIG. 9 is another detailed flowchart (method 2) of step S502 in FIG. 3 according to the first variation. The steps in FIG. 9 that are the same as those in FIG. 5 are denoted by the same reference numerals, and redundant description thereof will be avoided. Likewise, the steps in FIG. 9 that are the same as those in FIG. 8 are denoted by the same reference numerals, and redundant description thereof will be avoided.

In step S901, the hand detection unit 105 detects the number of hands within the reading area and determines the detected number of hands to be H[T]. An existing technique is used for the hand detection. For example, the hand detection can be executed by detecting a skin color or a shape. In this step, the number of hands detected by the above technique is used.

In step S902, the determination unit 106 determines whether the number H[T] is 2. Namely, in this step, the determination unit 106 determines whether both hands have been detected.

If the determination unit 106 determines that the number H[T] is not 2 (NO in step S902), the operation proceeds to step S702. If the number H[T] is 2 (YES in step S902), the operation proceeds to step S803.

In FIG. 8, even when a hand is present within the reading area, whether the object has been reversed is determined. However, in FIG. 9, after the hand detection unit 105 determines that a hand is not present within the reading area, the determination unit 106 determines whether the object has been reversed. Thus, processing load for comparing the sizes and the contents of the objects can be reduced.

Figure 10B:
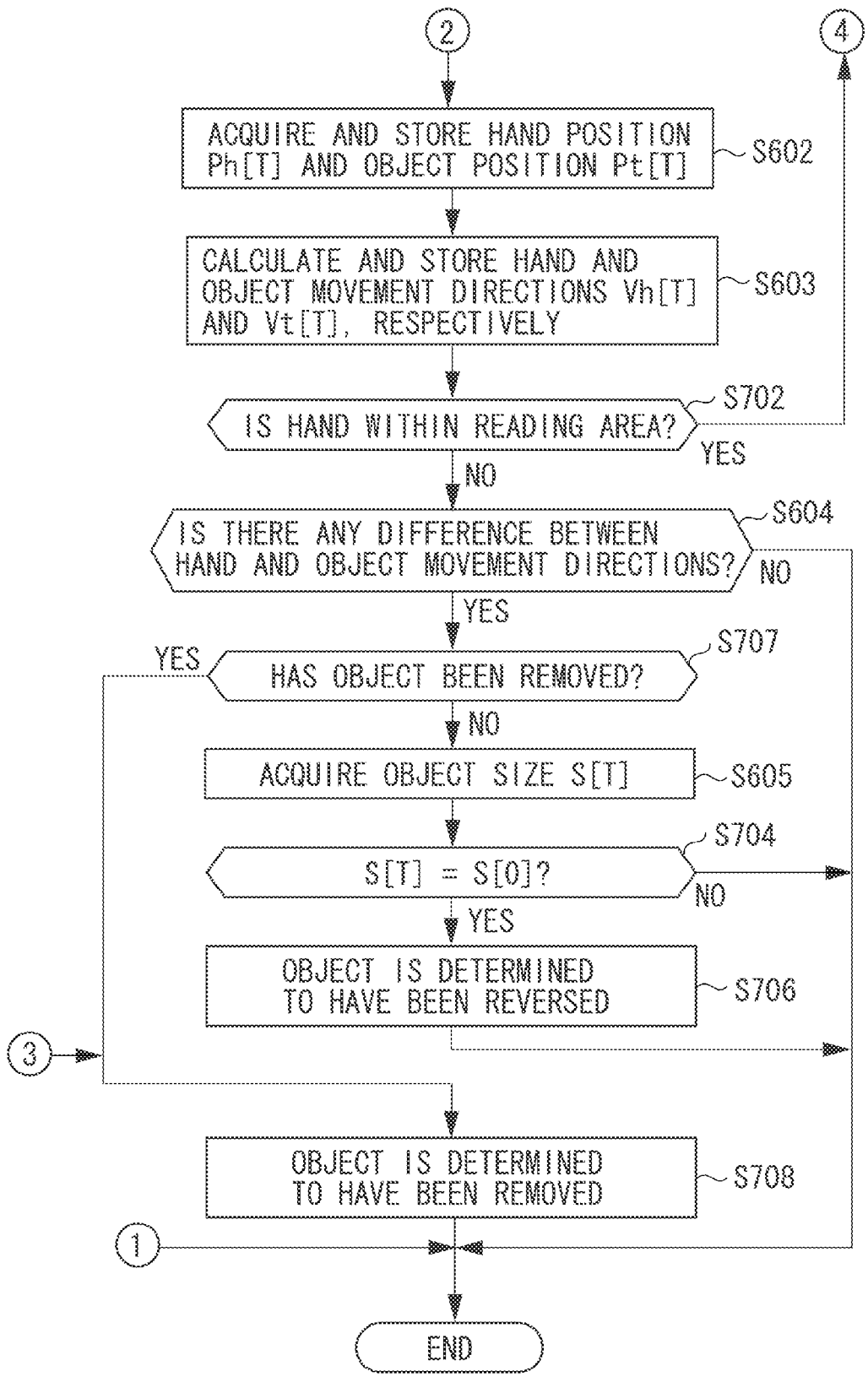
FIG. 10, composed of FIGS. 10A and 10B, is another detailed flowchart (method 3) of step S502 in FIG. 3 according to the first variation.

FIG. 10 is another detailed flowchart (method 3) of step S502 in FIG. 3 according to the first variation. The steps in FIG. 10 that are the same as those in FIG. 6 are denoted by the same reference numerals, and redundant description thereof will be avoided. Likewise, the steps in FIG. 10 that are the same as those in FIG. 8 are denoted by the same reference numerals, and redundant description thereof will be avoided.

In FIG. 8, the content of the object is used to determine whether the object has been reversed. However, in FIG. 10, instead of using the content of the object, the hand and the object moving directions are used to determine whether the object has been reversed. Thus, whether the object has been reversed can be determined without using the content of the object.

Thus, as described above, according to the first variation of the first exemplary embodiment, even when a user holds two objects each in one hand and switches the objects, the reading apparatus 101 does not erroneously determine that the object has been reversed.

Figure 7F:
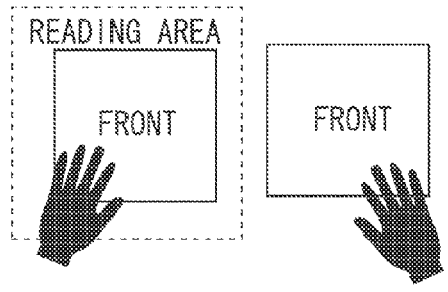

FIGS. 7D to 7F illustrate objects being switched by both hands.

FIG. 7D illustrates the right hand 4 that is about to remove the front-side document 2 from the reading plate after the front-side document 2 is read.

FIG. 7E illustrates the left hand 5 placing the front-side document 3 on the reading plate while the right hand 4 is removing the front-side document 2 from the reading plate.

FIG. 7F illustrates the right hand 4 having removed the front-side document 2 from the reading plate and the left hand 5 placing the front-side document 3 on the reading plate.

In this way, when two documents are being switched by both hands, both of the hands may not be recognized in the reading area, as illustrated in FIG. 7E. Namely, both of the hands could be switched instantly and only a single hand could be recognized. Accordingly, a second variation will be described, assuming that two documents are switched by both hands and the hands recognized in the reading area are switched instantly.

FIG. 11 is a detailed flowchart (method 1) of step S502 in FIG. 3 according to the second variation. The steps in FIG. 11 that are the same as those in FIG. 4 are denoted by the same reference numerals, and redundant description thereof will be avoided.

In step S1101, the object detection unit 103 acquires the size S[0] and the content C[0] of the object read in step S501 and stores the size S[0] and the content C[0] in the storage unit 102. In addition, the hand detection unit 105 acquires the hand position Ph[0] and stores the position Ph[0] in the storage unit 102.

In step S1102, the hand detection unit 105 determines the hand position detected within the reading area to be Ph[T]. An existing technique is used for the hand detection. For example, the hand detection can be executed by detecting a skin color or a shape. In this step, information about the hand position detected by the above technique is used.

In step S1103, the determination unit 106 determines whether the distance between the positions Ph[T−1] and Ph[T] is more than a threshold Dth. If coordinates of the position Ph[T−1] are (X1,Y1) and coordinates of the position Ph[T] are (X2, Y2), the distance D between the positions Ph[T−1] and Ph[T] can be obtained by the following expression (1).

$$D=\sqrt{(X2-X1)^2+(Y2-Y1)^2} \quad (1)$$

A predetermined value may be used as the threshold Dth. Alternatively, each distance D between positions Ph[T−1] and Ph[T] until the time T reaches the current value from 0 may be stored and the mean value of the distances may be used.

If the distance D is more than the threshold Dth (YES in step S1103), the operation proceeds to step S1104. If not (NO in step S1103), the operation proceeds to step S704.

In step S1104, the object detection unit 107 determines whether the object has been removed from the reading plate.

FIG. 12 is another detailed flowchart (method 2) of step S502 in FIG. 3 according to the second variation. The steps in FIG. 12 that are the same as those in FIG. 5 are denoted by the same reference numerals, and redundant description thereof will be avoided. Likewise, the steps in FIG. 12 that are the same as those in FIG. 11 are denoted by the same reference numerals, and redundant description thereof will be avoided.

In step S1201, the hand detection unit 105 determines the hand position detected within the reading area to be Ph[T]. The same technique as that used in step S1102 can be used for the hand detection.

In step S1202, the determination unit 106 determines whether the distance between the positions Ph[T−1] and Ph[T] is more than the threshold Dth. The same mathematical expression and determination method as those used in step S1103 can be used.

If the distance D is more than the threshold Dth (YES in step S1202), the operation proceeds to step S1203. If not (NO in step S1202), the operation returns to step S710.

In step S1203, the object detection unit 103 determines whether the object has been removed from the reading plate.

In FIG. 11, even when a hand is present within the reading area, whether the object has been reversed is determined. However, in FIG. 12, after the hand detection unit 105 determines that a hand is not present within the reading area, the determination unit 106 determines whether the object has been reversed. Thus, processing load for comparing the sizes and the contents of the objects can be reduced.

Figure 13:
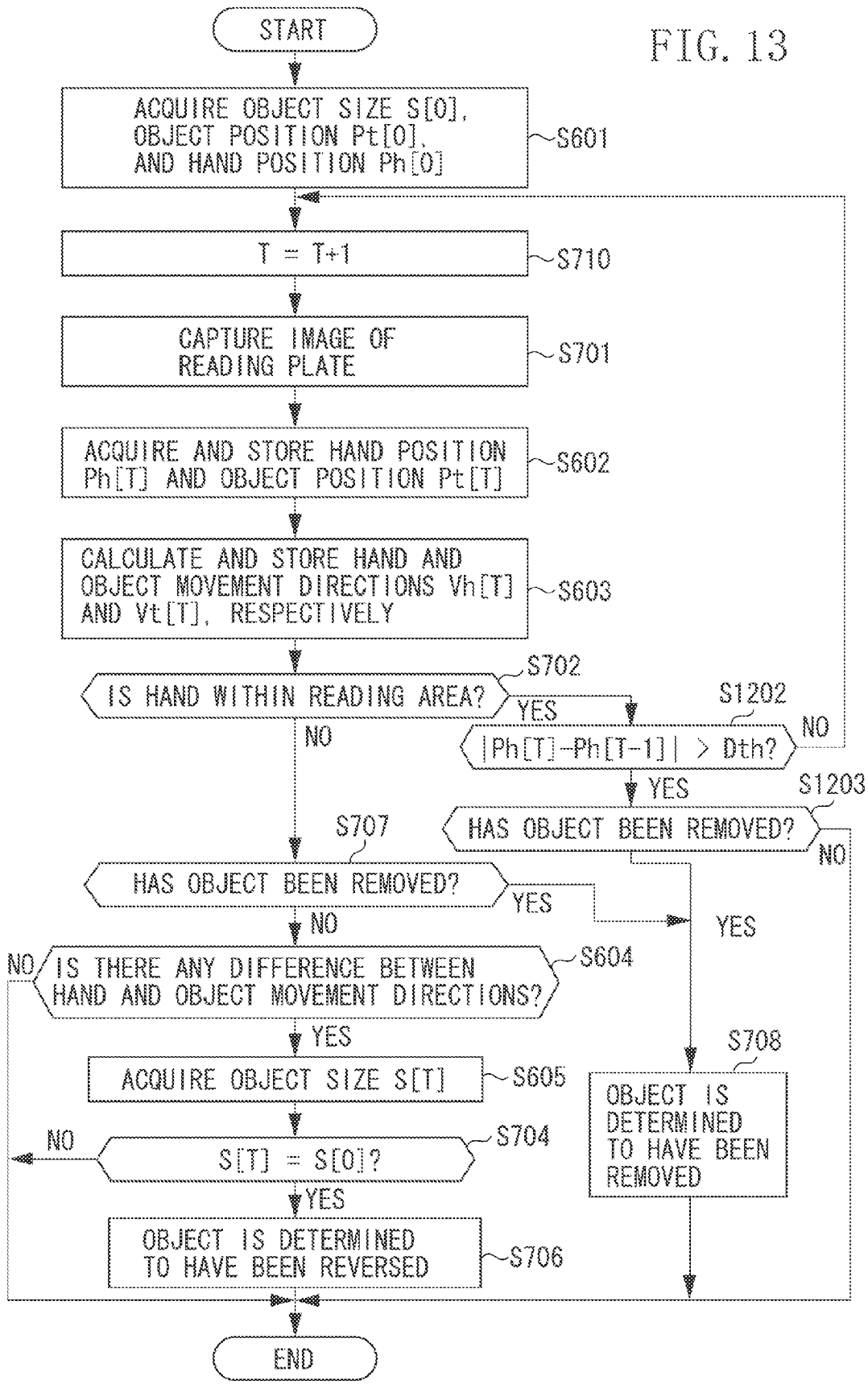
FIG. 13 is another detailed flowchart (method 3) of step S502 in FIG. 3 according to the second variation.

FIG. 13 is another detailed flowchart (method 3) of step S502 in FIG. 3 according to the second variation. The steps in FIG. 13 that are the same as those in FIG. 6 are denoted by the same reference numerals, and redundant description thereof will be avoided. Likewise, the steps in FIG. 13 that are the same as those in FIG. 12 are denoted by the same reference numerals, and redundant description thereof will be avoided. As described with reference to FIG. 6, in FIG. 13, by using the hand and object moving directions, whether the object has been reversed can be determined without using the content of the object.

Thus, as described above, according to the second variation of the first exemplary embodiment, even when the user holds two objects each in one hand and switches the objects, the reading apparatus 101 can prevent the erroneous determination that the object has been reversed.

According to the first exemplary embodiment, examples of the objects to be read include sheet documents, objects having a certain thickness, and objects having a three-dimensional shape.

In addition, data is stored in the storage device 108 in steps S504 and S505. However, alternatively, instead of storing the data, the reading apparatus 101 may cause the printing apparatus 109 to print the data. In such case, in step S504, the storage unit 102 associates the read data as the front-side document (the image read in step S501) and the back-side document (the image read in step S503), and the printing apparatus 109 prints the data.

In step S505, the storage unit 102 associates the read data as the front-side document (the image read in step S501) and the printing apparatus 109 prints the data. Namely, two-sided printing is executed in step S504, and one-sided printing is executed in step S505.

In FIG. 11, the content of the object is used to determine whether the object has been reversed. However, in FIG. 13, the hand and object moving directions are used to determine whether the object has been reversed, without using the content of the object. Moreover, the change in object size can be used to determine whether the object has been reversed, instead of using the content of the object and the hand and object moving directions. To be more precise, since the area within a contour of the object decreases when the object is reversed, the determination as to whether the area within a contour of the object decreases may be proper to determine whether the object has been reversed.

Thus, as described above, according to the present exemplary embodiment, by determining whether the object has been reversed or removed by the user, the read data is associated. In this way, an explicit input by the user for associating the read data can be reduced.

According to the first exemplary embodiment, whether an object has been reversed or removed is determined by detecting a user's hand, and depending on the determination result, the setting of two sides are associated with each other. According to a second exemplary embodiment, whether an object has been reversed is detected by detecting a user's hand, and a binding position of a two-page spread is set by detecting an object moving direction. A function block diagram of a reading apparatus 101 according to the second exemplary embodiment is the same as FIG. 1A.

FIG. 14 is a flowchart of an operation of the reading apparatus 101 according to the second exemplary embodiment. The steps in FIG. 14 that are the same as those in FIG. 3 according to the first exemplary embodiment are denoted by the same reference numerals, and redundant description thereof will be avoided.

In step S1401, the object detection unit 103 acquires coordinates of the corners of the object G[0] read in step S501 and stores the coordinates G[0] in the storage unit 102. The coordinates of the corners of the object are read as described above. If the object is not rectangular, coordinates of the corners of the minimum circumscribed rectangle of the object are used.

In step S1402, the object detection unit 103 acquires coordinates of the corners of the object G[T] and stores the coordinates G[T] in the storage unit 102.

In step S1403, the determination unit 106 determines whether the position of the object, which is determined to have been reversed in step S502, has been moved. The determination unit 106 uses the coordinates G[T] and G[0] to determine whether the position of the object has been moved.

The following description will be made assuming that the object coordinates G[0] are represented by the top-left corner (Xp11, Yp11), the top-right corner (Xp12, Yp12), the bottom-left corner (Xp13, Yp13), and the bottom-right corner (Xp14, Yp14).

In addition, the following description will be made assuming that the object coordinates G[T] are represent by the top-left corner (Xp21, Yp21), the top-right corner (Xp22, Yp22), the bottom-left corner (Xp23, Yp23), and the bottom-right corner (Xp24, Yp24). If any one of the following conditions 1 to 3 is satisfied, the determination unit 106 determines that the position of the object has been moved. If none of the conditions is satisfied, the determination unit 106 determines that the position of the object has not been moved.

Condition 1 is Xp21<Xp12 and Xp14<Xp23. Condition 2 is Xp22<Xp11 and Xp24<Xp13. Condition 3 is Yp11<Yp23 and Yp12<Yp24.

If the determination unit 106 determines that the position of the object has been moved (YES in step S1403), the operation proceeds to step S1404. Otherwise (NO in step S1403), the operation proceeds to step S503.

In step S1404, the object detection unit 103 stores the object moving direction in the storage unit 102. If conditions 1 to 3 are satisfied, the determination unit 106 determines that the object moving direction is from left to right, from right to left, and from bottom to top, respectively.

In step S1405, the object detection unit 103 acquires the number of objects and determines whether the acquired number of objects is 2. If the object detection unit 103 determines that the number of objects is 2 (YES in step S1404), the operation proceeds to step S1406. Otherwise (NO in step S1404), the operation proceeds to step S503.

In step S1406, the storage unit 102 stores information indicating a binding setting.

In step S1407, the imaging unit 104 reads the object that has not been reversed and stores the data in the storage unit 102 as a page next to the reversed object.

In step S1408, the determination unit 106 determines whether the information indicating a binding setting is stored in the storage unit 102. If the determination unit 106 determines a binding setting (YES in step S1408), the operation proceeds to step S1409. Otherwise (NO in step S1408), the operation proceeds to step S504.

In step S1409, the association unit 110 associates the binding position and the front- and back-side documents of the read data, and stores the associated data in the storage device 108. The binding position is determined based on the moving direction stored in step S1404. If the object moving direction is from left to right, the binding position is determined to be on the right. If the object moving direction is from right to left, the binding position is determined to be on the left. If the object moving direction is from bottom to top, the binding position is determined to be on the top.

Any one of the flowcharts in FIGS. 4 to 6 and FIGS. 8 to 13 may be used for step S502 in FIG. 14.

Thus, as described above, by detecting whether the object has been reversed and moved by the user, the two-page spread document and the binding position can be set.

According to the second exemplary embodiment, examples of the objects to be read include sheet documents, objects having a certain thickness, and objects having a three-dimensional shape.

In addition, data is stored in the storage device 108 in steps S504, S505, and S1407. However, alternatively, instead of storing the data, the reading apparatus 101 may cause the printing apparatus 109 to print the data. In such case, in step S504, the storage unit 102 associates the read data as the front- and back-side documents and the printing apparatus 109 executes two-sided printing. In step S505, the storage unit 102 stores the read data as the front-side document and the printing apparatus 109 executes one-sided printing. In addition, in step S1407, the storage unit 102 associates the read data as the front- and back-side documents, and the printing apparatus 109 executes two-sided printing. Further, the document is stapled at the binding position or a punch hole is made at the binding position.

Thus, as described above, according to the present exemplary embodiment, since a two-page spread document and a binding position are set by detecting whether an object has been reversed or moved by a user, an explicit input by the user can be reduced.

According to the above exemplary embodiments, based on a user operation executed on an object, two sides of a read image can be associated with each other.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-076773 filed Mar. 29, 2012, which is hereby incorporated by reference herein in its entirety.

What is claimed is:

1. A reading apparatus, comprising:
 a first reading unit configured to read a faceup side of an object placed on a reading plate, and configured to acquire first image data;
 a determination unit configured to determine whether the object read by the first reading unit has been reversed based on information detected about the object;
 a second reading unit configured to read, if the determination unit determines that the object read by the first reading unit has been reversed, a side which has become a faceup side of the object, and configured to acquire second image data; and
 an association unit configured to associate the first image data acquired by the first reading unit with the second image data acquired by the second reading unit as data read from a same object.

2. The reading apparatus according to claim 1,
 wherein the determination unit determines whether the object read by the first reading unit has been reversed or has been removed based on information detected about the object, and
 wherein the reading apparatus further comprises a storage unit configured to store, in a case where the determination unit determines that the object read by the first reading unit has been removed, the first image data acquired by the first reading unit as stored data.

3. The reading apparatus according to claim 2, further comprising:
 a detection unit configured to detect the number of user's hands and the number of objects within a reading area of the first reading unit,
 wherein the determination unit further determines whether the object read by the first reading unit has been removed based on the number of hands and the detected number of objects detected by the detection unit.

4. The reading apparatus according to claim 2, further comprising:
 a detection unit configured to detect the position of a user's hand, wherein the determination unit further determines whether the read object read by the first reading unit has been removed based on the hand position detected by the detection unit.

5. The reading apparatus according to claim 1, wherein the information detected about the read object includes a size and a content of the object detected by using an imaging unit.

6. The reading apparatus according to claim 1, further comprising:
a detection unit configured to detect movement of a user's hand and movement of the object,
wherein the determination unit determines whether the object read by the first reading unit has been reversed based on the hand and object movements detected by the detection unit and the information detected about the object.

7. The reading apparatus according to claim 1, further comprising:
a detection unit configured to detect a moving direction of the object,
wherein the association unit determines a binding position based on the moving direction of the object detected by the detection unit and associates the determined binding position with the first image data acquired by the first reading unit and the second data acquired by the second reading unit.

8. A method of controlling a reading apparatus, the method comprising;
firstly reading a faceup side of an object placed on a reading plate, and acquiring first image data;
determining whether the object read by the firstly reading has been reversed based on information about the object;
secondly reading, if the object read by the firstly reading is determined to have been reversed, a side which has become a faceup side of the object, and acquiring second image data; and
associating the first image data acquired by the firstly read with the second image data acquired by the secondly reading as data read from a same object.

9. The method according to claim 8,
wherein the information detected about the read object includes a size and a content of the object detected by using an imaging unit.

10. A computer-readable storage medium storing a computer program that causes a computer to function as each unit included in the reading apparatus according to claim 1.

11. A reading apparatus, comprising:
a first reading unit configured to read a faceup side of an object placed on a reading plate, and configured to acquire first image data;
a determination unit configured to determine whether the object read by the first reading unit has been reversed or removed based on information detected about the object;
a second reading unit configured to read, in a case where the determination unit determines that the object read by the first reading unit has been reversed, a side which has become a faceup side of the object, and configured to acquire second image data; and
a storage unit configured to associate, if the determination unit determines that the object has been reversed, the first image data acquired by the first reading unit with the second image data acquired by the second reading unit to be stored as data read from a same object, and configured to store, if the determination unit determines that the object read by the first reading unit has been removed, the read data of the object.

12. A method of controlling a reading apparatus, the method comprising:
firstly reading a faceup side of an object placed on a reading plate, and acquiring first image data;
determining whether the object read by the firstly reading has been reversed or removed based on information about the object;
secondly reading, in a case where the object read by the firstly reading is determined to have been reversed, a side which has become a faceup side of the object, and acquiring second image data;
associating, if the object is determined to have been reversed, the first image data acquired by the firstly reading with the second image data acquired by the secondly reading to be stored as data read from a same object; and
storing, if the object read by the firstly reading is determined to have been removed, the read data of the object.

13. A computer-readable storage medium storing a computer program that causes a computer to function as each unit included in the reading apparatus according to claim 11.

14. A reading apparatus, comprising:
an acquisition unit configured to acquire image data representing a faceup side of an object placed on a reading plate;
a determination unit configured to determine whether a faceup side of the object placed on the reading plate has been changed, based on information detected about the object; and
an association unit configured to associate, if the determination unit determines that a faceup side of the object placed on the reading plate has been changed, the first image data representing a faceup side of the object before the change with the second image data representing a side which has become a faceup side of the object after the change, as data read from a same object.

15. The reading apparatus according to claim 14, wherein the information detected about the object includes a size and a content of the object.

16. The reading apparatus according to claim 14, further comprising:
a detection unit configured to detect movement of a user's hand and movement of the object,
wherein the determination unit determines whether a faceup side of the object placed on the reading plate has been changed based on the hand and object movements detected by the detection unit and the information detected about the object.

17. The reading apparatus according to claim 14, further comprising:
a detection unit configured to detect the number of user's hands and the number of objects within a reading area of the first reading unit,
wherein the determination unit further determines whether the object placed on the reading plate has been removed based on the number of hands and the detected number of objects detected by the detection unit.

18. The reading apparatus according to claim 14, further comprising:
a detection unit configured to detect a position of a user's hand,
wherein the determination unit further determines whether the object placed on the reading plate has been removed based on the hand position detected by the detection unit.

19. A computer-readable storage medium storing a computer program that causes a computer to function as each unit included in the reading apparatus according to claim 14.

20. A method of controlling a reading apparatus, the method comprising:

acquiring image data representing a faceup side of an object placed on a reading plate;

determining whether a faceup side of the object placed on the reading plate has been changed, based on information detected about the object; and associating, if the determining determines that a faceup side of the object placed on the reading plate has been changed, the first image data representing a faceup side of the object before the change with the second image data representing a side which has become a faceup side of the object after the change, as data read from a same object.

* * * * *